US011140105B2

(12) United States Patent
Stafford et al.

(10) Patent No.: US 11,140,105 B2
(45) Date of Patent: Oct. 5, 2021

(54) METHOD AND SYSTEM FOR PROVIDING INTEROPERABILITY FOR RICH COMMUNICATION SUITE (RCS) MESSAGING

(71) Applicants: Brian R. Stafford, Wilmette, IL (US); Michael C. Lamb, St. Louis, MO (US)

(72) Inventors: Brian R. Stafford, Wilmette, IL (US); Michael C. Lamb, St. Louis, MO (US)

(73) Assignee: nativeMsg, Inc., Chicago, IL (US)

( * ) Notice: Subject to any disclaimer, the term of this patent is extended or adjusted under 35 U.S.C. 154(b) by 0 days.

(21) Appl. No.: 16/923,592

(22) Filed: Jul. 8, 2020

(65) Prior Publication Data

US 2021/0014182 A1 Jan. 14, 2021

Related U.S. Application Data

(60) Provisional application No. 62/873,423, filed on Jul. 12, 2019.

(51) Int. Cl.
| | |
|---|---|
| H04L 12/58 | (2006.01) |
| H04W 8/26 | (2009.01) |
| H04L 29/08 | (2006.01) |
| H04W 4/14 | (2009.01) |
| H04W 4/80 | (2018.01) |
| H04W 12/033 | (2021.01) |

(52) U.S. Cl.
CPC ............ *H04L 51/066* (2013.01); *H04L 51/38* (2013.01); *H04L 67/02* (2013.01); *H04W 4/14* (2013.01); *H04W 4/80* (2018.02); *H04W 8/26* (2013.01); *H04W 12/033* (2021.01)

(58) Field of Classification Search
CPC ....... H04L 51/066; H04L 51/38; H04L 67/02; H04W 4/80; H04W 4/14; H04W 12/033; H04W 8/26
See application file for complete search history.

(56) References Cited

U.S. PATENT DOCUMENTS

| | | |
|---|---|---|
| 8,463,765 B2 | 6/2013 | Lesavich |
| 9,006,566 B2 | 4/2015 | Ihama |
| 9,037,564 B2 | 5/2015 | Lesavich et al. |
| 9,094,050 B2 * | 7/2015 | Blankenship ........... H04W 4/21 |

(Continued)

OTHER PUBLICATIONS

RCS Interworking Guidelines Version 14.0, Oct. 13, 2017.

(Continued)

*Primary Examiner* — Azizul Choudhury
(74) *Attorney, Agent, or Firm* — Lesavich High-Tech Law Group, S.C.; Stephen Lesavich

(57) ABSTRACT

A method and system for providing interoperability for Rich Communications Suite/Systems (RCS) messaging. If a target network device cannot receive RCS messages, electronic messages are modified on an RCS message application to include an electronic link to an RCS interoperability application. The RCS interoperability application independently provides seamless, rich multi-media RCS functionality to the target network device when the electronic link is activated in the modified electronic message. The RCS interoperability application provides two-way RCS message communications between target network devices without RCS functionality and target network devices with RCS functionality.

20 Claims, 11 Drawing Sheets

(56) References Cited

U.S. PATENT DOCUMENTS

| | | |
|---|---|---|
| 9,137,250 B2 | 9/2015 | Lesavich et al. |
| 9,361,479 B2 | 6/2016 | Lesavich et al. |
| 9,397,878 B2 | 7/2016 | Seth et al. |
| 9,549,073 B2* | 1/2017 | Zitnik .................... H04L 51/38 |
| 9,569,771 B2 | 2/2017 | Lesavich et al. |
| 10,237,805 B2 | 3/2019 | Carter et al. |
| 10,462,290 B2 | 10/2019 | Ehlen et al. |
| 10,666,790 B2 | 5/2020 | Ehlen et al. |
| 2011/0208710 A1 | 8/2011 | Lesavich |
| 2012/0096115 A1 | 4/2012 | McColgan et al. |
| 2012/0278622 A1 | 11/2012 | Lesavich et al. |
| 2014/0189792 A1 | 7/2014 | Lesavich et al. |
| 2014/0215078 A1 | 7/2014 | Seth et al. |
| 2015/0379301 A1 | 12/2015 | Lesavich et al. |
| 2016/0219490 A1 | 7/2016 | Carter et al. |
| 2016/0226923 A1 | 8/2016 | Purkop et al. |
| 2016/0321654 A1 | 11/2016 | Lesavich et al. |
| 2016/0344863 A1 | 11/2016 | Ehlen et al. |
| 2016/0344865 A1 | 11/2016 | Ehlen et al. |
| 2020/0327199 A1* | 10/2020 | Iyer ...................... H04L 67/306 |

OTHER PUBLICATIONS

GSM Association, Rich Communication Suite RCS API Detailed Requirements, version 3.0, Oct. 19, 2017.
Rich Communication Suite 8.0 Advanced Communications Services and Client Specification Version 9.0, May 16, 2018.
RCS Universal Profile Service Definition Document Version 2.2, May 16, 2018.
Rich Communication Suite Endorsement of OMA CPM 2.2 Conversation Functions Version 9.0, Oct. 16, 2019.

* cited by examiner

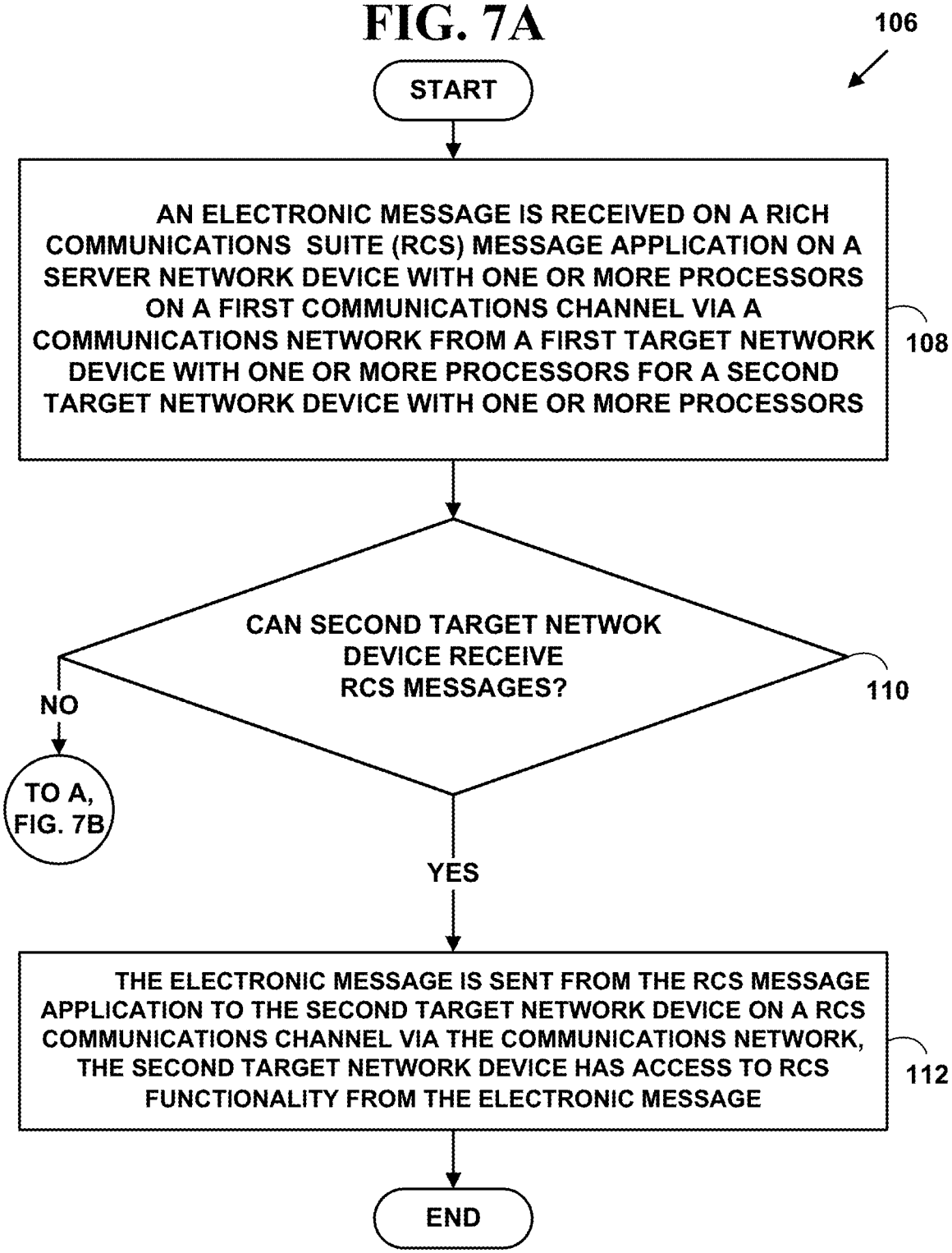

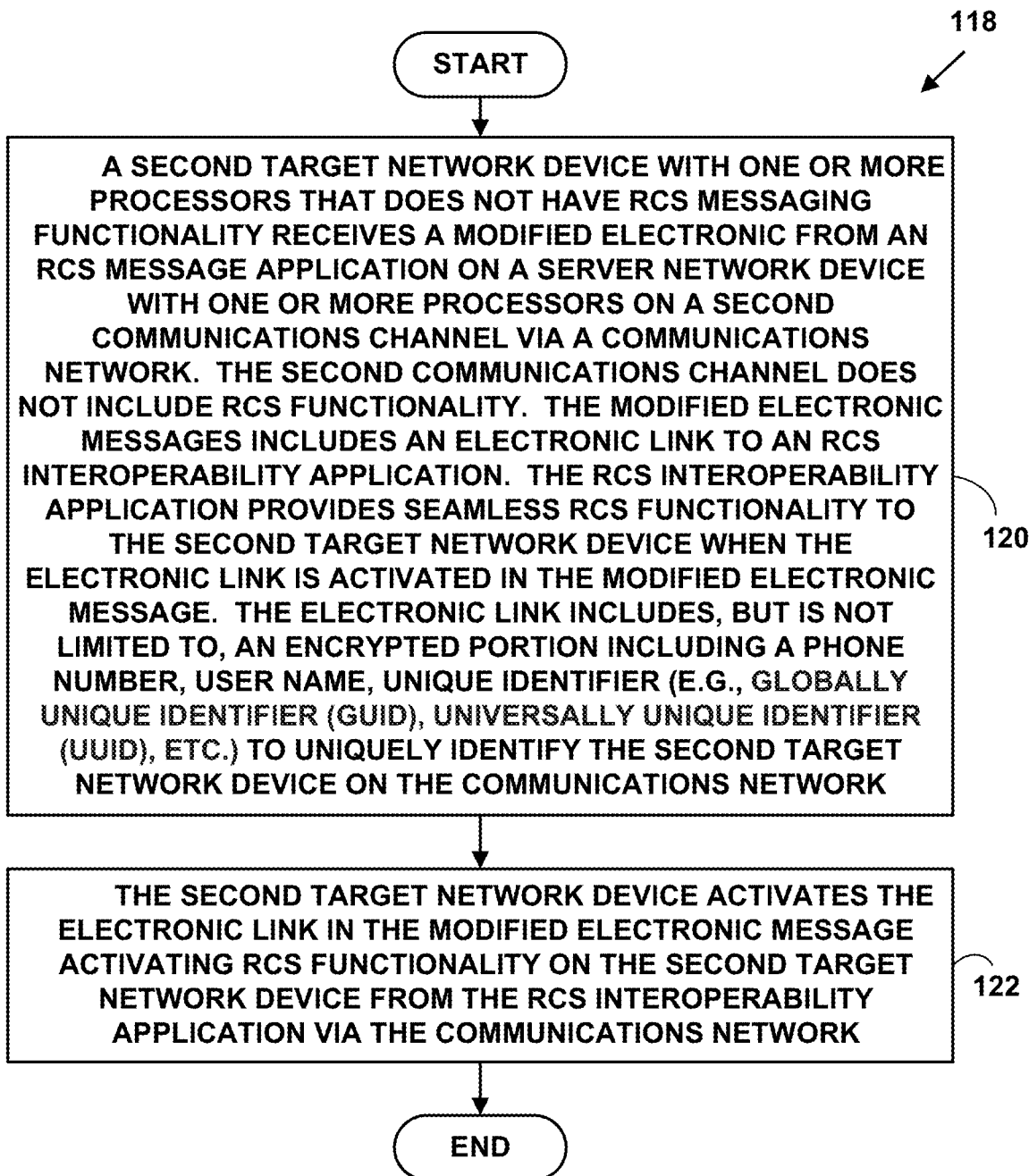

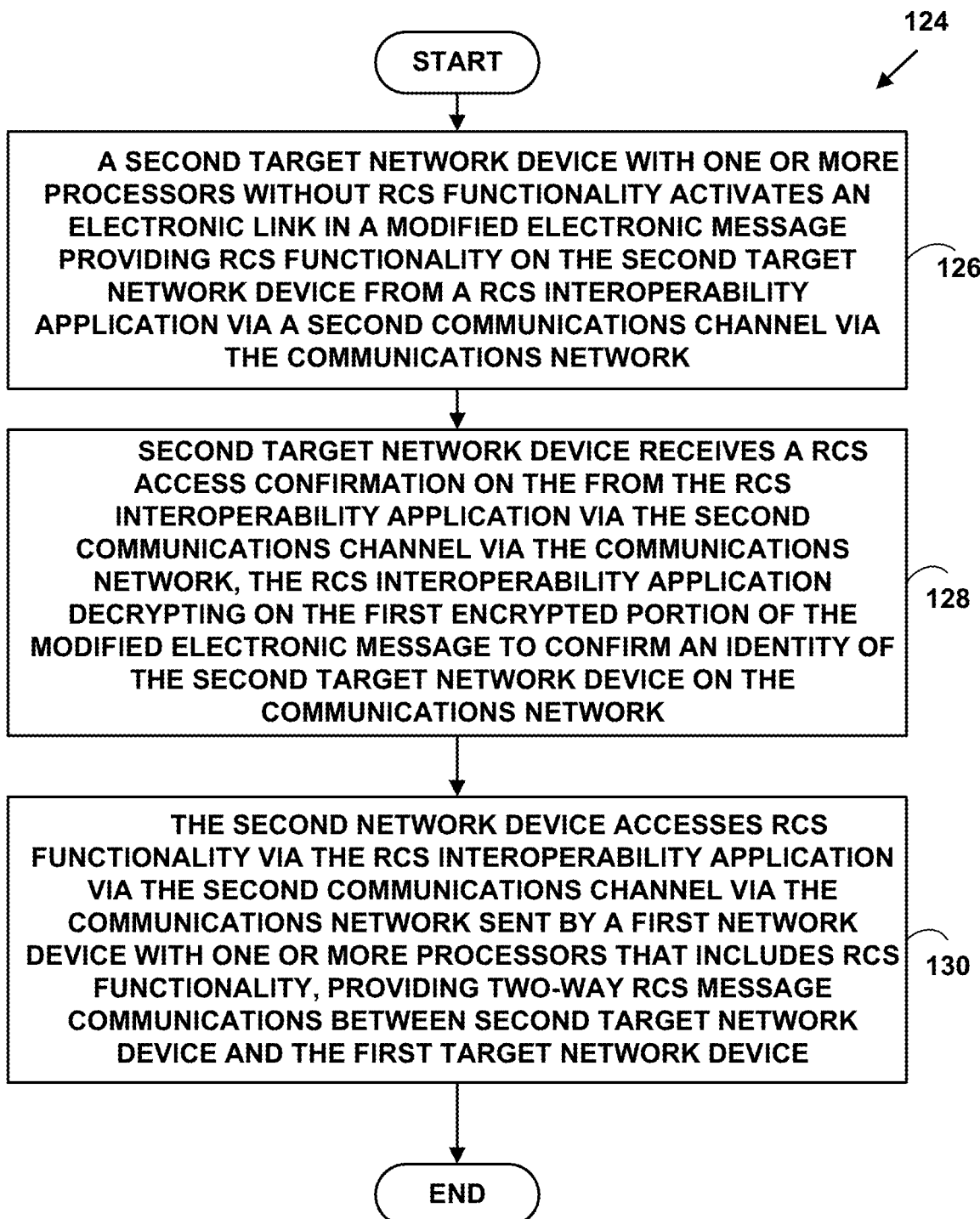

METHOD AND SYSTEM FOR PROVIDING INTEROPERABILITY FOR RICH COMMUNICATION SUITE (RCS) MESSAGING

CROSS REFERENCES TO RELATED APPLICATIONS

The U.S. Utility patent application claims priority to U.S. Provisional patent application No. 62/873,423, filed on Jul. 12, 2019, the contents of which are incorporated herein by reference.

FIELD OF INVENTION

This invention relates to electronic messages. More specifically, it relates to a method and system for providing interoperability for Rich Communication Suite/Systems (RCS) messaging.

BACKGROUND OF THE INVENTION

The invention of electronic messaging predates the some of the first mobile phones including the iPhone, BlackBerry, and the Palm Pilot. Short Messaging Service (SMS) also called text messaging, was first proposed in 1982 for the Global System for Mobile Communications (GSM), a second-generation cell standard devised by the European Telecommunications Standards Institute (ETSI).

The idea, at least initially, was to transmit texts via the signaling systems that controlled telephone traffic. ETSI engineers developed a framework that was both small enough to fit into the existing signaling paths (128 bytes, later improved to 160 seven-bit characters) and modular enough to support carrier management features like real-time billing, message rerouting (i.e., routing messages to a recipient other than the one specified by the user), and message blocking.

After nearly a decade of changes, SMS deployed commercially in December 1992. A milestone that Neil Papworth, an engineer, marked by texting "Merry Christmas" to Vodafone customer Richard Jarvis. In the years that followed, handset manufacturers including Nokia and carriers like Fleet Call (now Nextel) and BT Cellnet (now O2 UK) adopted text messaging. By 2010, nearly 20 years after the first text message was sent, cell subscribers exchanged over 6.1 trillion text messages.

Despite the explosive growth of SMS, it didn't evolve all that much from the systems of the early '90s. Even as phone form factors changed and Apple's iPhone popularized the modern-day touchscreen smartphone, SMS remained the same right down to the 160-character limit imposed at its inception. It is estimated that SMS messages are used on about 97% of smart phones, world-wide.

There are a number of problems associated with text (SMS) messages. One problem is that if a user has a mobile phone that is roaming or does not have a cellular signal, the user cannot send or receive text messages.

Another problem is that a single SMS message is still limited to 160 characters.

Another problem is that text messages don't support many of the modern features like animated stickers, that other message graphical applications like FACEBOOK Messenger, WHATSAPP, WECHAT and other support.

Rich Communication Suite (RCS) is a communication protocol between mobile telephone carriers and between phone and carrier, aiming at replacing SMS messages with a text-message system that is richer, provides phonebook polling (e.g., for service discovery), and can transmit in-call multimedia. It is also marketed under the names of Advanced Messaging, Advanced Communications, Chat, Joyn, Message+ and SMS+.

RCS was first formed in 2007 and was taken over by the GSM Association (GSMA), the industry trade body that represents mobile operators worldwide, in 2008. In 2016, the GSMA agreed on a Universal Profile—a set of standards that all mobile operators, phone manufacturers and software providers can use to help implement RCS on devices.

RCS messaging is very much like WHATSAPP, where live chat can take place, including multi-media support, with everything handled via the data network. It's seen as a rival to APPLE's iMessage service, although there are some subtle differences between how these services operate.

The biggest advantage RCS Messaging has over SMS—and the reason it will be implemented in the first place—is that it will enable users to send rich, verified messages. This means electronic messages will be able to carry more information, so users can send things like photos, videos and audio messages to one another.

RCS messages can carry out video calls directly within the RCS messaging app, rather than having to rely on third-party software. Group messages are possible with RCS, and little things such as read receipts and indicators to show other users are typing a message will be included as well.

RCS messages rely on data in order to be sent between users, and so messages are sent with client-to-server encryption. The RCS protocol should also prevent spam messages from reaching a cell phone, as for a company to be able to send a message via RCS, they have to go through a brand verification process.

RCS includes features that APPLE iMessage, WHATAPP and FACEBOOK Messenger have offered for some time.

There are a number of problems associated with using RCS messaging. One problem is that not all mobile phone companies support RCS messaging. APPLE is noticeably absent from the list companies that support RCS.

Another problem is that there are many variations of the RCS protocol, so mobile phones using a first version of RCS on a network isn't supported on other network that uses another version of RCS.

Another problem is the interoperability issues between mobile phones and networks that do and do not support RCS. For example, if an RCS message is sent to a mobile phone or network that does not don't support RCS, the mobile phone or network will instead be sent as a regular text (SMS) message instead of an RCS message. This prevents the user of the mobile phone or network from experiencing all the rich features provided by RCS messages.

Thus, it is desirable to solve some of the interoperability problems associated with providing Rich Communications Suite (RCS) to mobile phones or networks that do not support RCS.

SUMMARY OF THE INVENTION

In accordance with preferred embodiments of the present invention, some of the problems associated with text (SMS) messages are overcome. A method and system for providing interoperability for Rich Communication Suite/System (RCS) messaging is presented.

If a target network device cannot receive RCS messages, electronic messages are modified on an RCS message application to include an electronic link to an RCS interoperability application. The RCS interoperability application independently provides seamless, rich multi-media RCS functionality to the target network device when the electronic link is activated in the modified electronic message. The RCS interoperability application provides two-way RCS message communications between target network devices without RCS functionality and target network devices with RCS functionality.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 7A and 7B are a flow diagram illustrating a method for providing interoperability for Rich Communication Suite (RCS) messaging;

FIG. 8 is a flow diagram illustrating a method for providing interoperability for Rich Communications Suite (RCS) messaging;

FIG. 9 is a flow diagram illustrating a method for providing interoperability for Rich Communications Suite (RCS) messaging.

DETAILED DESCRIPTION OF THE INVENTION

Exemplary Electronic Message Processing and Display System

Figure 1:
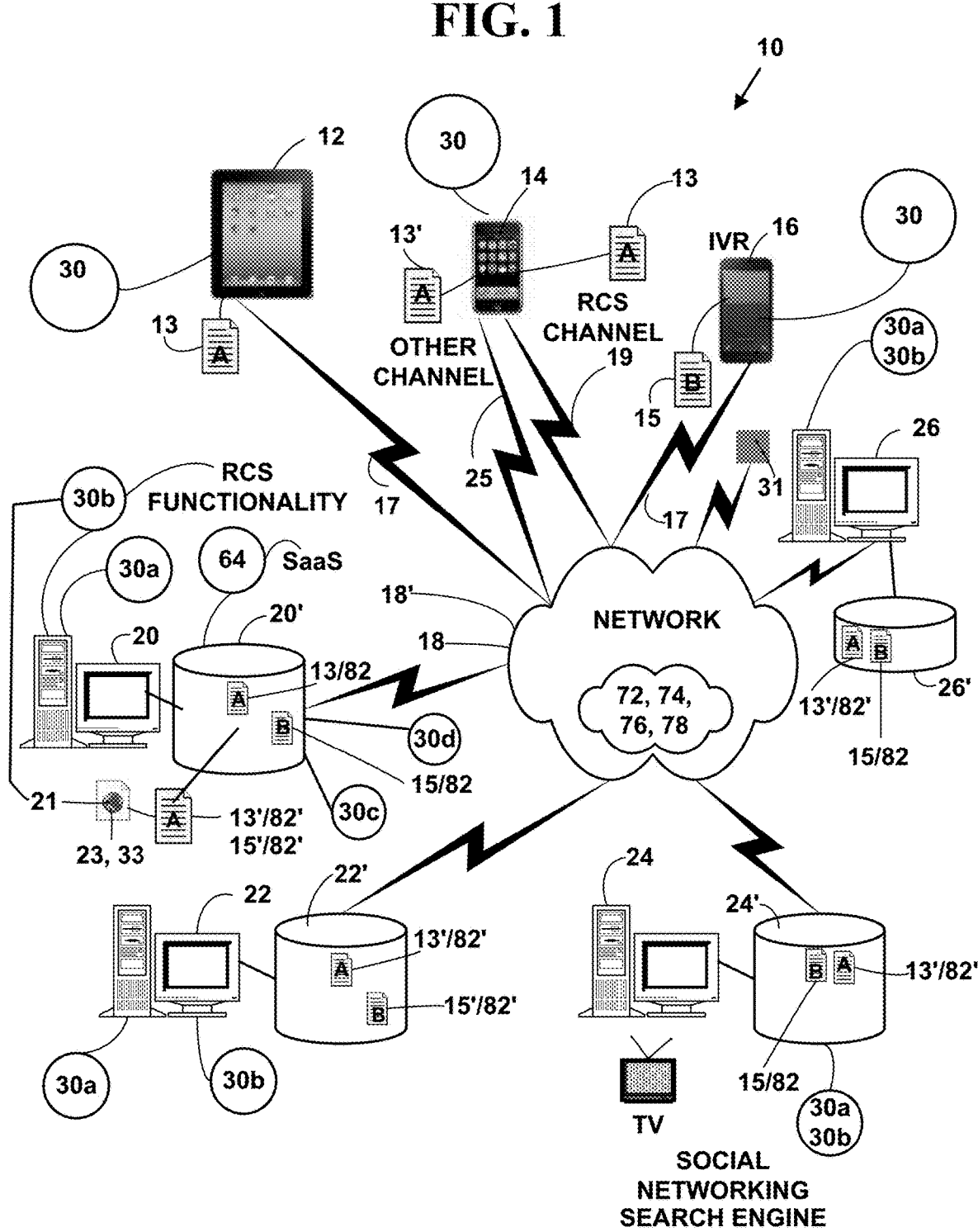
FIG. 1 is a block diagram illustrating an exemplary electronic message processing and display system.

FIG. 1 is a block diagram illustrating an exemplary electronic message display system 10 for sending and receiving electronic messages. The exemplary electronic system 10 includes, but is not limited to, one or more target network devices 12, 14, 16, etc. each with one or more processors and each with a non-transitory computer readable medium.

The one or more target network devices 12, 14, 16 (illustrated in FIG. 1 only as a tablet and two smart phones for simplicity) include, but are not limited to, desktop and laptop computers, tablet computers, mobile phones, non-mobile phones with displays, three-dimensional (3D) printers, robots, smart phones, Internet phones, Internet appliances, personal digital/data assistants (PDA), portable, handheld and desktop video game devices, Internet of Things (IoT) devices, cable television (CATV), satellite television (SATV) and Internet television set-top boxes, digital televisions including high definition television (HDTV), three-dimensional (3DTV) televisions, wearable network devices 106-112 (FIG. 6), smart speakers 31 and/or other types of network devices.

A "smart phone" is a mobile phone 14 that offers more advanced computing ability and connectivity than a contemporary basic feature phone. Smart phones and feature phones may be thought of as handheld computers integrated with a mobile telephone, but while most feature phones are able to run applications based on platforms such as JAVA ME, a smart phone usually allows the user to install and run more advanced applications. Smart phones and/or tablet computers run complete operating system software providing a platform for application developers.

The tablet computers 12 include, but are not limited to, tablet computers such as the IPAD, by APPLE, Inc., the HP Tablet, by HEWLETT PACKARD, Inc., the PLAYBOOK, by RIM, Inc., the TABLET, by SONY, Inc., etc.

A "smart speaker" 31 is a type of wireless speaker and voice command device with an integrated virtual assistant that offers interactive actions and hands-free activation with the help of one "hot word" (or several "hot words"). Some smart speakers can also act as a smart device that utilizes Wi-Fi, Bluetooth and other wireless protocol standards to extend usage beyond audio playback, such as to control home automation devices. This can include, but is not be limited to, features such as compatibility across a number of services and platforms, peer-to-peer connection through mesh networking, virtual assistants, and others. Each can have its own designated interface and features in-house, usually launched or controlled via application or home automation software. Some smart speakers also include a screen to show the user a visual response.

The IoT network devices, include but are not limited to, security cameras, doorbells with real-time video cameras, baby monitors, televisions, set-top boxes, lighting, heating (e.g., smart thermostats, etc.), ventilation, air conditioning (HVAC) systems, and appliances such as washers, dryers, robotic vacuums, air purifiers, ovens, refrigerators, freezers, toys, game platform controllers, game platform attachments (e.g., guns, googles, sports equipment, etc.), and/or other IoT network devices.

The target network devices 12, 14, 16 are in communications with a cloud communications network 18 or a non-cloud computing network 18' via one or more wired and/or wireless communications interfaces. The cloud communications network 18, is also called a "cloud computing network" herein and the terms may be used interchangeably.

The plural target network devices 12, 14, 16 make requests 13, 15 for electronic messages (e.g., SMS, RCS, etc.) via the cloud communications network 18 or non-cloud communications network 18'

The cloud communications network 18 and non-cloud communications network 18' includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16, 31, 98-104 via the cloud communications network 18 and non-cloud communications network 18'.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, 22, 24, 26, etc.) store portions 13', 15' of the electronic content 13, 15 (e.g., SMS, RCS messages, etc.) as cloud storage objects 82 (FIG. 5) as is described herein.

The plural server network devices 20, 22, 24 26, may be connected to, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 and non-cloud communications network 18' includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 and non-cloud communications network 18' includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Electronic Content Display System

Figure 2:
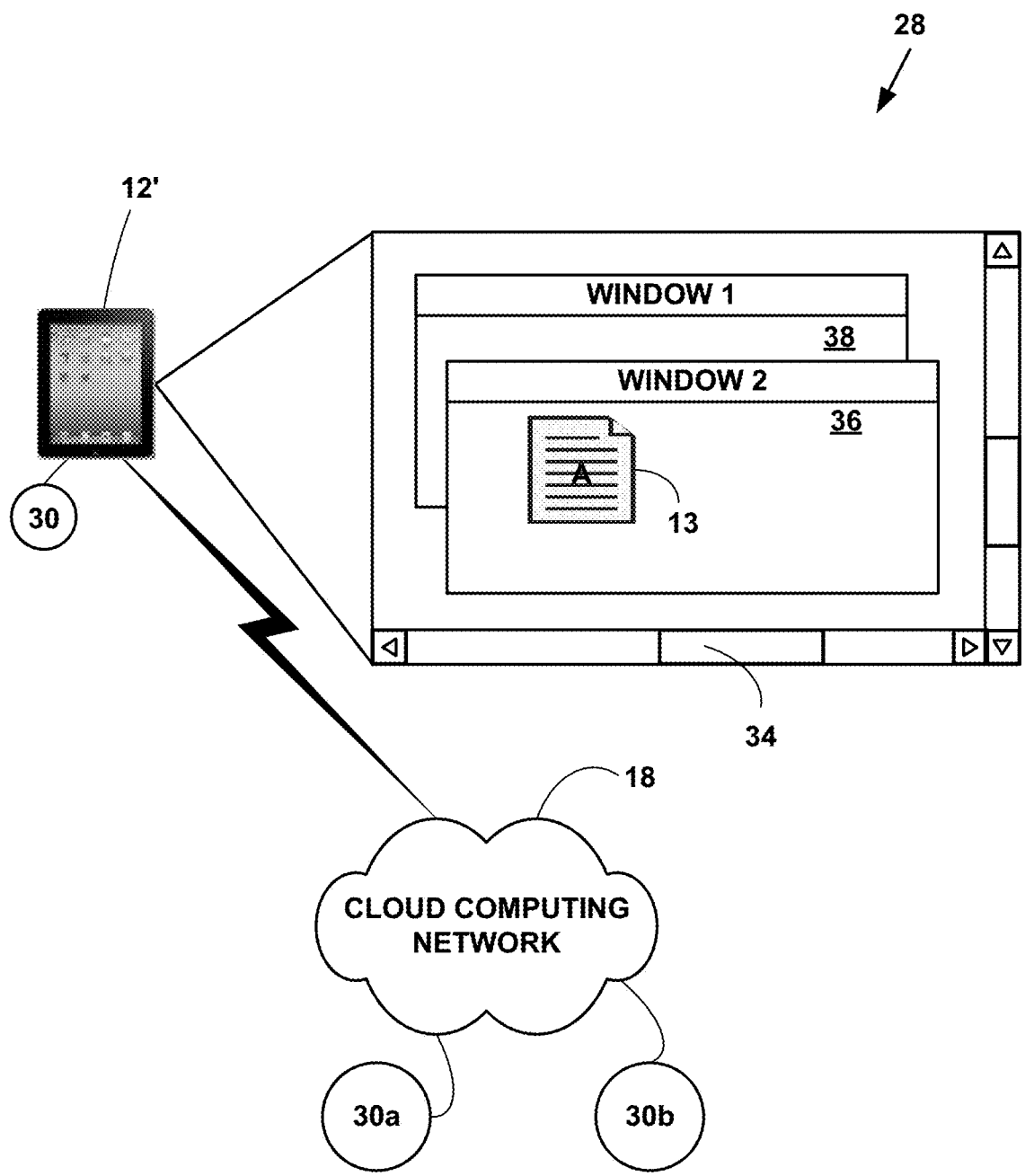
FIG. 2 is a block diagram illustrating an exemplary electronic message display system.

FIG. 2 is a block diagram illustrating an exemplary electronic message information display system 28. The exemplary electronic message information display system 12' includes, but is not limited to a target network device (e.g., 12, etc.) with an application 30 and a display component 32. The application 30 presents a graphical user interface (GUI) 34 on the display 32 component. The GUI 32 presents a multi-window 36, 38, etc. (only two of which are illustrated) interface to a user.

In one embodiment of the invention, the application 30 is a software application. However, the present invention is not limited to this embodiment and the application 30 can be hardware, firmware, hardware and/or any combination thereof. In one embodiment, the application 30 includes a mobile application for a smart phone, electronic tablet and/or other network device. In one embodiment, the application 30 includes web-browser based application. In one embodiment, the application 30 includes a web-chat client application. In another embodiment, the application 30a, 30b, 30c, 30d includes a cloud application used on a cloud communications network 18. However, the present invention is not limited these embodiments and other embodiments can be used to practice the invention In another embodiment, a portion of the application 30 is executing on the target network devices 12, 14, 16, 31, 98-104 and another portion of the application 30a, 30b, 30c, 30d is executing on the server network devices 20, 22, 24, 26. The applications also include one or more library applications. However, the present invention is not limited these embodiments and other embodiments can be used to practice the invention.

Exemplary Networking Protocol Stack

Figure 3:
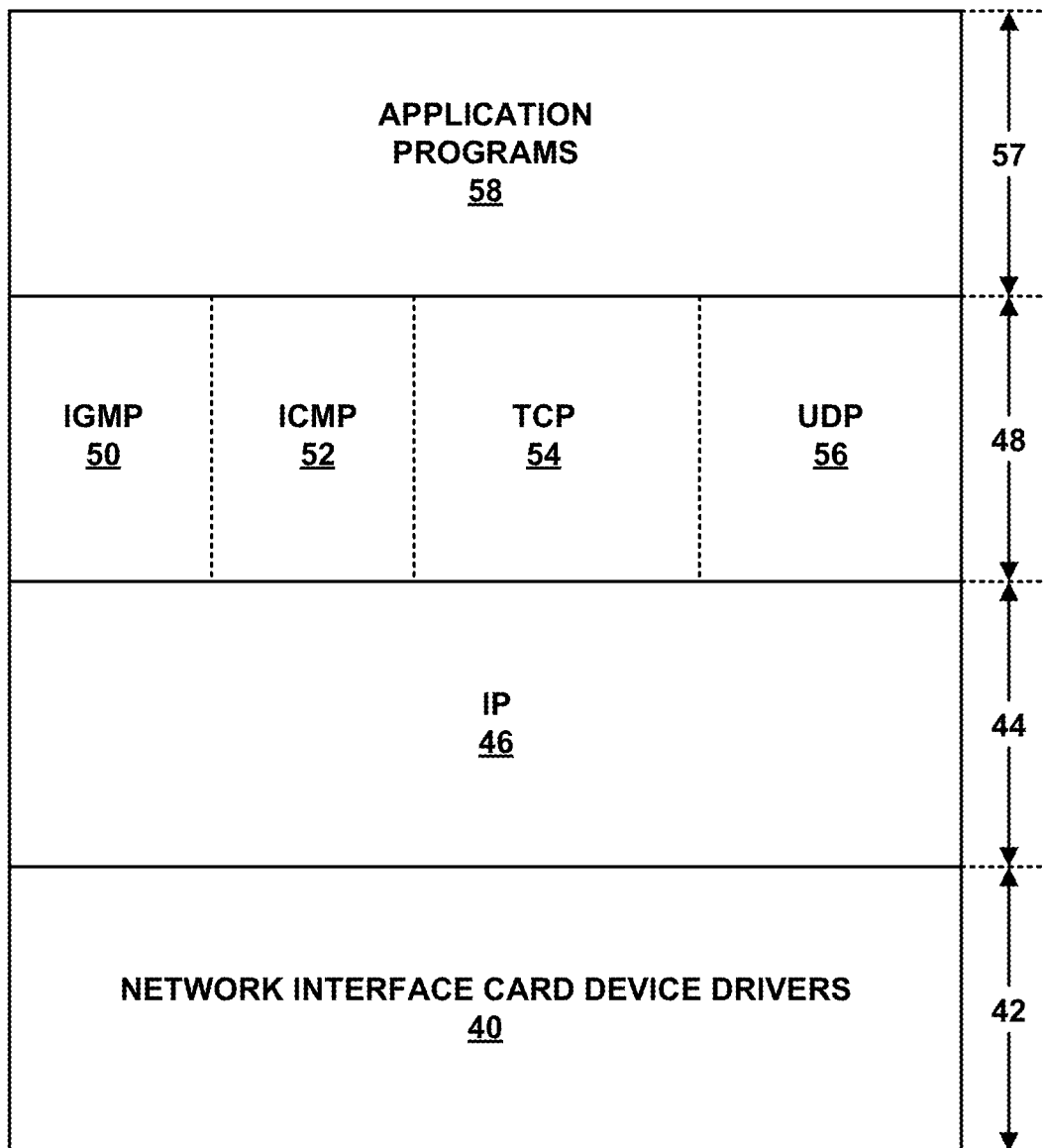
FIG. 3 is a block diagram illustrating an exemplary networking protocol stack.

FIG. 3 a block diagram illustrating a layered protocol stack 38 for network devices in the electronic message information display system 10. The layered protocol stack 38 is described with respect to Internet Protocol (IP) suites comprising in general from lowest-to-highest, a link 42, network 44, transport 48 and application 56 layers. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer).

The network devices 12, 14, 16, 20, 22, 24, 26, 31, 98-104 are connected to the communication network 18 with Network Interface Card (NIC) cards including device drivers 40 in a link layer 42 for the actual hardware connecting the network devices 12, 14, 16, 20, 22, 24, 26, 31, 98-104 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30*a*, 30*b*, 30*c*, 30*d*, etc.) to carry out desired functionality for a network device reside. For example, the application programs 58 for the client network devices 12, 14, 16, 27, 29, 31, 98-104 may include web-browsers or other application programs, application program 30, while application programs for the server network devices 20, 22, 24, 26 may include other application programs (e.g., 30*a*, 30*b*, 30*c*, 30*d*, etc.).

In one embodiment, application program 30 includes a RCS message, application 30*a*, a RCS functionality application 30*b*, an Artificial Intelligence (AI) application 30*c* and/or other application 30*d*. However, the present invention is not limited to such an embodiment and more, fewer and/or other applications can be used to practice the invention.

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

In addition, markup languages such as HyperText Markup Language (HTML), EXtensible Markup Language (XML) and others are used.

HyperText Markup Language (HTML) is a markup language for creating web pages and other information that can be displayed in a web browser.

HTML is written in the form of HTML elements consisting of tags enclosed in angle brackets within the web page content. HTML tags most commonly come in pairs although some tags represent empty elements and so are unpaired. The first tag in a pair is the start tag, and the second tag is the end tag (they are also called opening tags and closing tags). In between these tags web designers can add text, further tags, comments and other types of text-based content.

The purpose of a web browser is to read HTML documents and compose them into visible or audible web pages. The browser does not display the HTML tags, but uses the tags to interpret the content of the page.

HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages.

EXtensible Markup Language (XML) is another markup language that defines a set of rules for encoding documents in a format that is both human-readable and machine-readable. It is defined in the XML 1.0 Specification produced by the W3C, the contents of which are incorporated by reference and several other related specifications, all free open standards.

XML a textual data format with strong support via Unicode for the languages of the world. Although the design of XML focuses on documents, it is widely used for the representation of arbitrary data structures, for example in web services. The oldest schema language for XML is the Document Type Definition (DTD). DTDs within XML documents define entities, which are arbitrary fragments of text and/or markup tags that the XML processor inserts in the DTD itself and in the XML document wherever they are referenced, like character escapes.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Wireless Interfaces

In one embodiment of the present invention, the wireless interfaces on network devices 12, 14, 16, 20, 22, 24, 26, 31,

98-104 include but are not limited to, IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home" wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps, two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, a full handshake protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WLP.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without buses can also be used to practice the invention.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18 or non-cloud communications network 18'.

The one or more target network devices 12, 14, 16, 20, 22, 24, 26, 31, 98-104 and one or more server network devices 20, 22, 24, 26 communicate with each other and other network devices with near field communications (NFC) and/or machine-to-machine (M2M) communications.

"Near field communication (NFC)" is a set of standards for smartphones and similar network devices to establish radio communication with each other by touching them together or bringing them into close proximity, usually no more than a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags 99 and/or sensor.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

An "RFID tag" is an object that can be applied to or incorporated into a product, animal, or person for the purpose of identification and/or tracking using RF signals.

An "RFID sensor" is a device that measures a physical quantity and converts it into an RF signal which can be read by an observer or by an instrument (e.g., target network devices 12, 14, 16, 20, 22, 24, 26, 31, 98-104, server network devices 20, 22, 24, 26, etc.)

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 20, 22, 24, 26, 31, 98-104 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications 30, 30a, 30b, 30c, 30d provide cloud SaaS 64 services and/or non-cloud application services from television services over the cloud communications network 18 or application services over the non-cloud communications network 18'. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications 30, 30a, 30b, 30c, 30d provide cloud SaaS 64 services and/or non-cloud application services from Internet television services over the cloud communications network 18 or non-cloud communications network 18'. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other network device.

"Web-TV" delivers digital content via broadband and mobile networks. The digital content is streamed to a viewer's set-top box, game console, computer, or other network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications 30, 30a, 30b, 30c, 30d provide cloud SaaS 64 services and/or non-cloud application services from general search engine services. A search engine is designed to search for information on a cloud communications network 18 or non-cloud communications network 18' such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30a, 30b, 30c, 30d provide cloud SaaS 64 services and/or non-cloud application services from general search engine services. In another embodiment, the cloud applications 30, 30a, 30b, 30c, 30d provide general search engine services by interacting with one or more other public search engines (e.g., GOOGLE, BING, YAHOO, etc.) and/or private search engine services.

In another embodiment, the cloud applications 30, 30a, 30b, 30c, 30d provide cloud SaaS 64 services and/or non-cloud application services from specialized search engine services, such as vertical search engine services by interacting with one or more other public vertical search engines (e.g., GALAXY.COM, etc.) and/or private search engine services.

However, the present invention is not limited to such general and/or vertical search engine services and more, fewer and/or other general search engine services can be used to practice the invention.

Social Networking Services

In one embodiment, the cloud applications 30, 30a, 30b, 30c, 30d provide cloud SaaS 64 services and/or non-cloud application services from one more social networking services including to/from one or more social networking web-sites (e.g., FACEBOOK, YOUTUBE, TWITTER, INSTAGRAM, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26, 31, 98-104 with wired and/or wireless interfaces of the present invention include one or more of the security and encryptions techniques discussed herein for secure communications on the cloud communications network 18 or non-cloud communications network 18'.

Application programs 58 (FIG. 2) include security and/or encryption application programs integral to and/or separate from the applications 30, 30a, 30b, 30c, 30d. Security and/or encryption programs may also exist in hardware components on the network devices (12, 14, 16, 20, 22, 24, 26, 31, 98-104) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i standard is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security methods are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
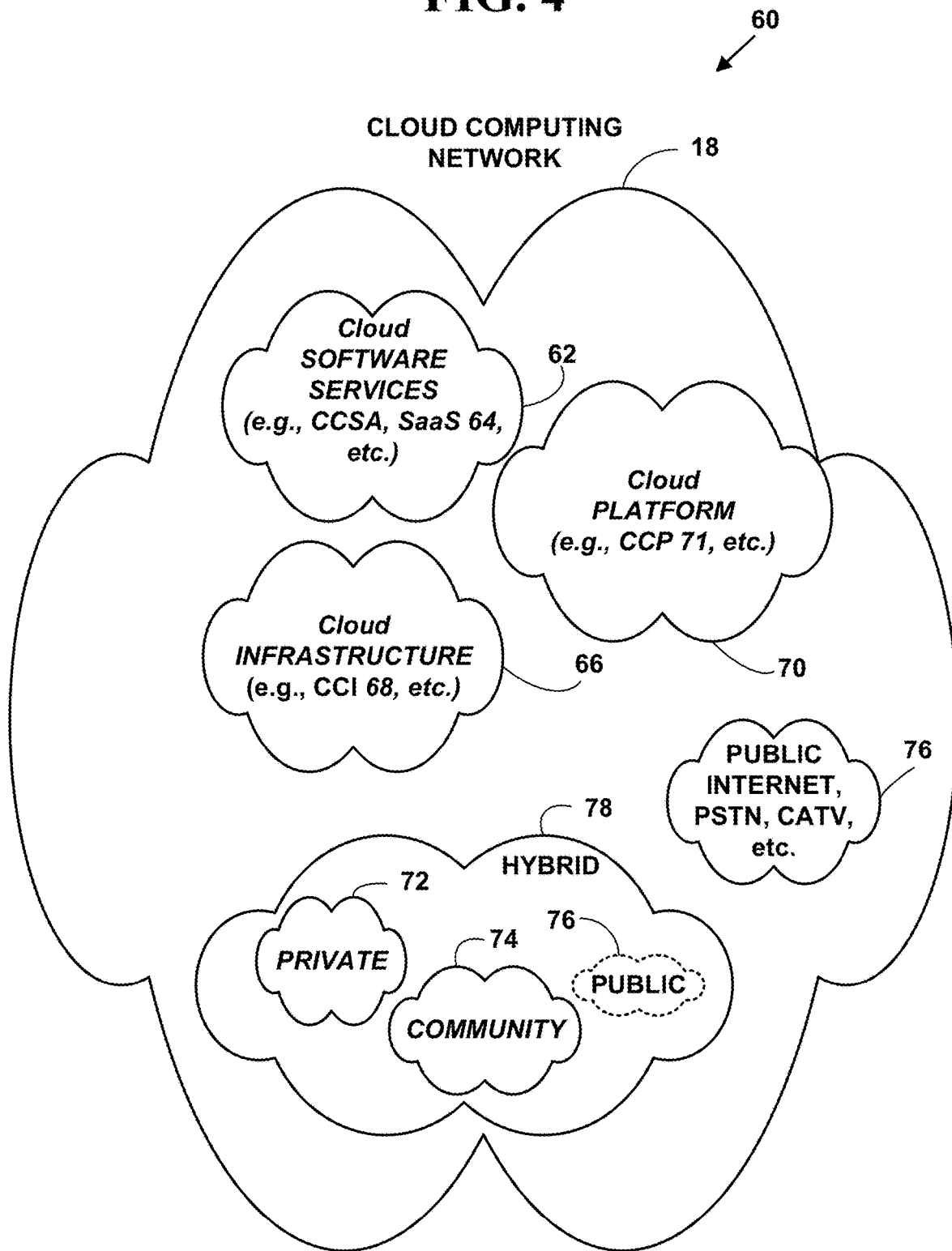
FIG. 4 is block diagram illustrating an exemplary cloud communications network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand, RCS Interoperability services. Automatic RCS interoperability services can unilaterally provision computing capabilities, such as server time and network storage, as needed automatically without requiring human interaction with each network server on the cloud communications network 18.
2. Broadband network access. Automatic RCS interoperability services capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G, 4G and 5G wireless and/or wired and broadband and/or ultra-broad band (e.g., WiMAX, etc.) network access.
3. Resource pooling. Automatic RCS interoperability services resources are pooled to serve multiple requesters using a multi-tenant model, with different physical and virtual resources dynamically assigned and reassigned according to demand. There is location independence TABLE 1-continued in that a requester of services has no control and/or knowledge over the exact location of the provided by the RCS interoperability service resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for RCS interoperability service collaboration. For automatic RCS interoperability service services, multi-media collaboration converters, the automatic RCS interoperability services collaboration and analytic conversion capabilities available for provisioning appear to be unlimited and can be used in any quantity at any time.
5. Measured Services. Cloud computing systems automatically control and optimize resource use by leveraging a metering capability at some level of abstraction appropriate to the type of automatic RCS interoperability services (e.g., storage, processing, bandwidth, custom electronic content retrieval applications, etc.). Electronic Automatic RCS interoperability services collaboration conversion usage is monitored, controlled, and reported providing transparency for both the automatic RCS interoperability services provider and the automatic RCS interoperability service requester of the utilized electronic content storage retrieval service.

Exemplary cloud computing service models illustrated in FIG. 4 appear in Table 2. However, the present invention is not limited to these service models and more, fewer or other service models can also be used to practice the invention.

TABLE 2

1. Cloud Computing Software Applications 62 for RCS interoperability services (CCSA, SaaS 64). The capability to use the provider's applications 30, 30a, 30b, 30c, 30d running on a cloud infrastructure 66. The cloud computing applications 62, are accessible from the server network device 20 from various client devices 12, 14, 16 through a thin client interface such as a web browser, etc. The user does not manage or control the underlying cloud infrastructure 66 including network, servers, operating systems, storage, or even individual application 30, 30a, 30b, 30c, 30d capabilities, with the possible exception of limited user-specific application configuration settings.
2. Cloud Computing Infrastructure 66 for RCS interoperability services (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30a, 30b, 30c, 30d. The user does not manage or control the underlying cloud infrastructure 66 but has control over operating systems, storage, deployed applications, and possibly limited control of select networking components (e.g., host firewalls, etc.).
3. Cloud Computing Platform 70 for RCS interoperability services (CCP 71). The capability provided to the user to deploy onto the cloud infrastructure 66 created or acquired applications created using programming languages and tools supported servers 20, 22, 24, 26, etc. The user not manage or control the underlying cloud infrastructure 66 including network, servers, operating systems, or storage, but has control over the deployed applications 30a, 30b, 30c, 30d and possibly application hosting environment configurations.

Exemplary cloud computing deployment models appear in Table 3. However, the present invention is not limited to these deployment models and more, fewer or other deployment models can also be used to practice the invention.

TABLE 3

1. Private cloud network 72. The cloud network infrastructure is operated solely for RCS interoperability services. It may be managed by the electronic content retrieval or a third party and may exist on premise or off premise.
2. Community cloud network 74. The cloud network infrastructure is shared by several different organizations and supports a specific electronic content storage and retrieval community that has shared concerns (e.g., mission, security requirements, policy, compliance considerations, etc.). It may be managed by the different organizations or a third party and may exist on premise or off premise.
3. Public cloud network 76. The cloud network infrastructure such as the Internet, PSTN, SATV, CATV, Internet TV, etc. is made available to the general public or a large industry group and is owned by one or more organizations selling cloud services.
4. Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for electronic content retrieval takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30, 30*a*, 30*b*, 30*c*, 30*d*, offers cloud services for RCS interoperability. The application 30, 30*a*, 30*b*, 30*c*, 30*d* offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 64 (SaaS) including a specific cloud software service 64 for RCS interoperability services. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
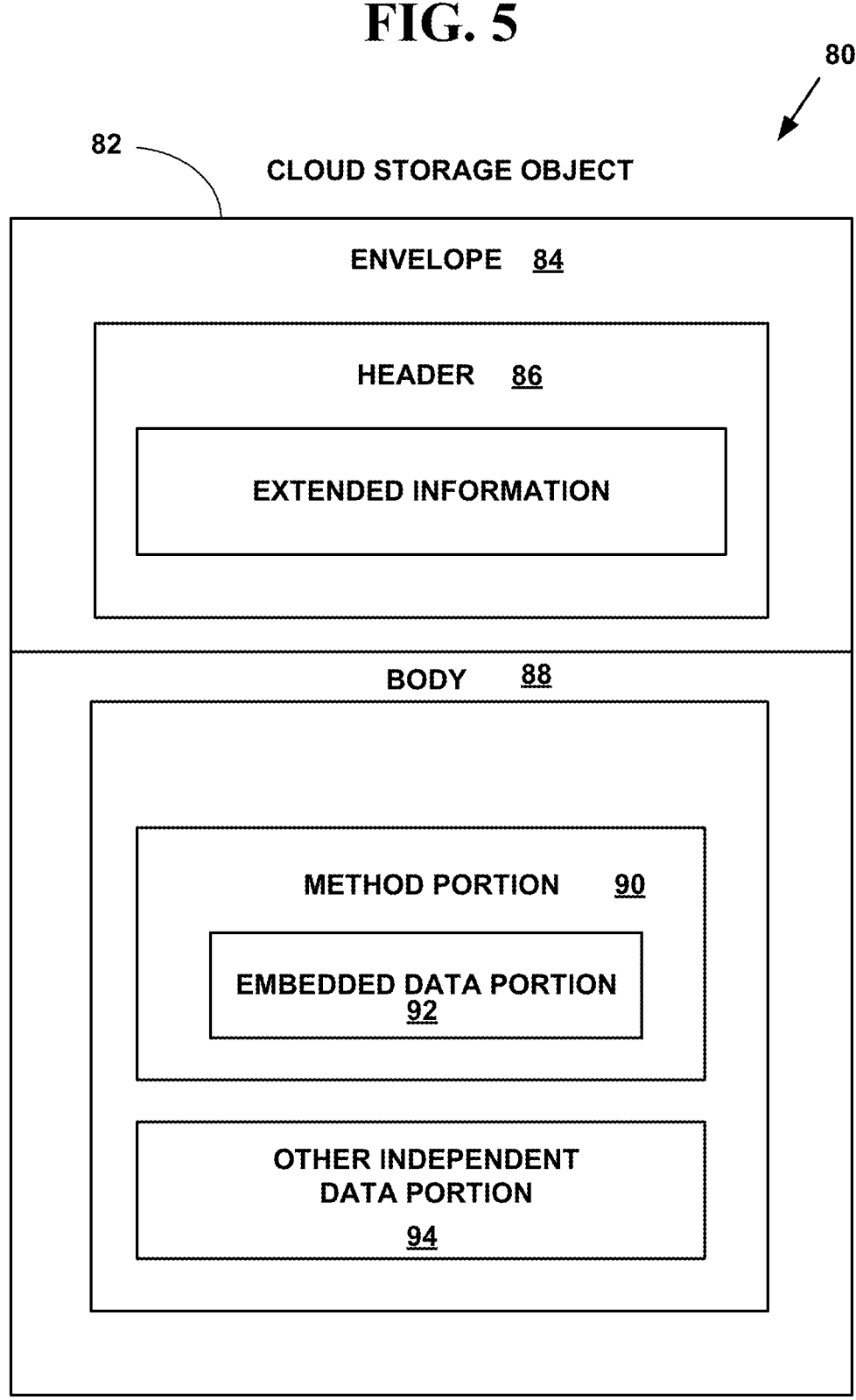
FIG. 5 is a block diagram illustrating an exemplary cloud storage object.

FIG. 5 is a block diagram 80 illustrating an exemplary cloud storage object 82. One or more server network devices (e.g., 20, 22, 24, 26, etc.) store portions 13', 15' of the electronic message content 13, 15 (e.g., SMS, RCS, etc.) as cloud storage objects 82 (FIG. 5) as is described herein.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30a, 30b, 30c, 30d.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction and provides access to automatic RCS interoperability services in a cloud or non-cloud environment. In one embodiment, the API for RCS interoperability services is available to network devices 12, 14, 16, 20, 22, 24, 26, 31, 98-104 and networks 18, 18'. However, the present invention is not limited to such an embodiment and other embodiments can be used to practice the invention.

Wearable Devices

Wearable technology" and/or "wearable devices" are clothing and accessories incorporating computer and advanced electronic technologies. Wearable network devices provide several advantages including, but not limited to: (1) Quicker access to notifications. Important and/or summary notifications are sent to alert a user to view the whole message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices take telemetric data recordings and providing useful feedback for users for exercise, health, fitness, etc. activities.

Figure 6:
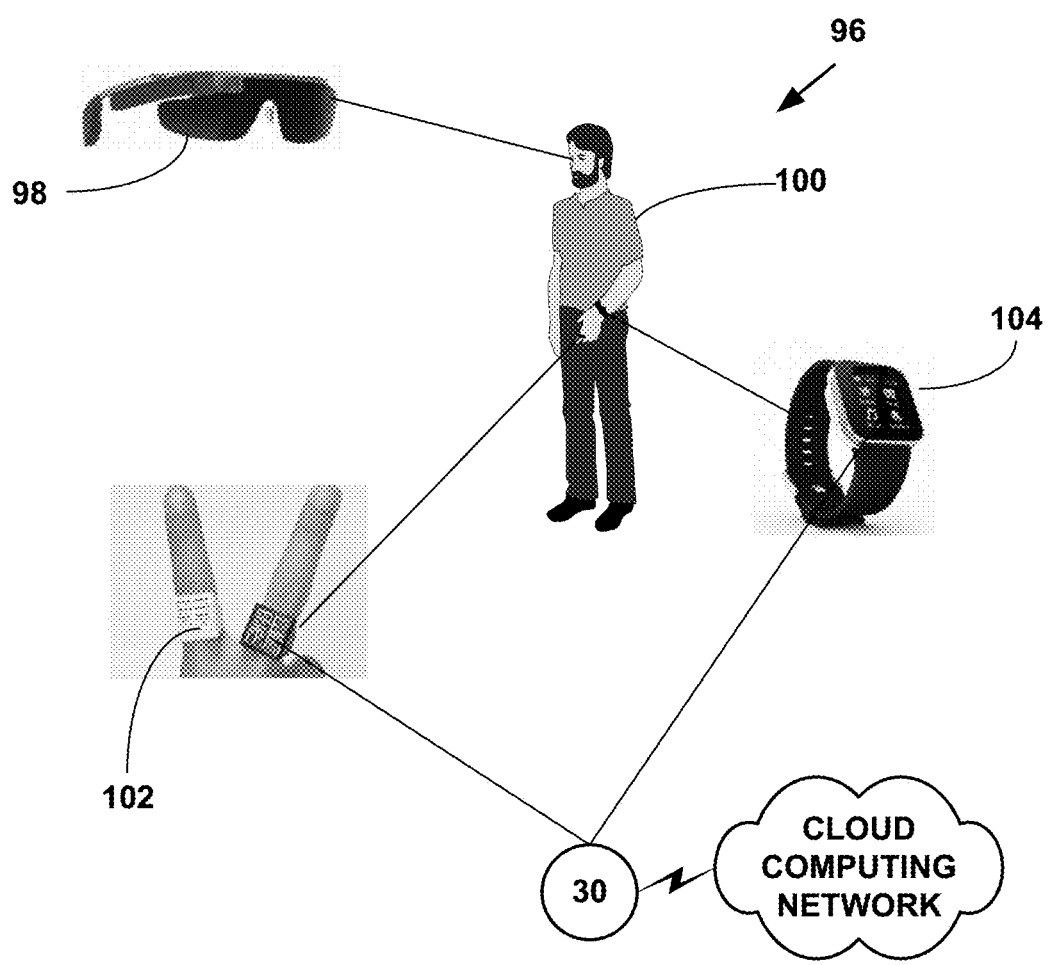
FIG. 6 is a block diagram illustrating wearable network devices.

FIG. 6 is a block diagram with 96 illustrating wearable devices. The wearable devices include one or more processors and include, but are not limited to, wearable digital glasses 98, clothing 100, jewelry 102 (e.g., smart rings, smart earrings, etc.) and/or watches 104. However, the present invention is not limited to such embodiments and more, fewer and other types of wearable devices can also be used to practice the invention.

In one specific embodiment, the application 30, 30a, 30b, 30c, 30d interacts with wearable devices 98-104 automatic RCS interoperability services the methods described herein However, the present invention is not limited this embodiment and other embodiments can also be used to practice the invention.

Artificial Intelligence (AI) and Big Data

"Artificial intelligence" (AI), also known as machine intelligence (MI), is intelligence demonstrated by machines, in contrast to the natural intelligence (NI) displayed by humans and other animals. AI research is defined as the study of "intelligent agents." Intelligent agents are any software application or hardware device that perceives its environment and takes actions that maximize its chance of successfully achieving its goals. Colloquially, the term "artificial intelligence" is applied when a machine mimics "cognitive" functions that humans associate with human brains, such as learning, problem solving and comparing large number of data points.

In one embodiment, the present invention uses one or more AI methods including, but are not limited to, AI knowledge-based methods 30c for (1) RCS interoperability services. However, the present invention is not limited to such an embodiment and more, fewer and/or other AI methods can be used to practice the invention.

In one embodiment, SaaS 64 includes and AI application 30c with the AI methods described herein. In another embodiment, the AI application 30c is a standalone application. However, the present invention is not limited to such an embodiment, and the AI application 30c can be provided in other than the SaaS 64.

"Big Data" refers to the use of predictive analytic methods that extract value from data, and to a particular size of data set. The quantities of data used are very large, at least 100,000 data points and more typically 500,000 to 1 Million+data points. Analysis of Big Data sets are used to find new correlations and to spot trends. In one embodiment, SaaS 64 includes and Big Data application 30d with the Big Data described herein.

In one embodiment, the AI methods described herein collect data information to create and store (e.g., in cloud storage object 82, etc.) a Big Data that is used to analyze trends find new correlations and to spot trends. However, the present invention is not limited to such an embodiment and the AI methods described herein can be used without Big Data sets.

Short Message Service (SMS) Messaging

Short Message Service (SMS) is an electronic text messaging service component of phone, Web, or mobile communication systems. It uses standardized communications protocols to allow fixed line or mobile phone devices to exchange short text messages.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies as well as satellite and landline networks.

The SMS Internet Engineering Task Force (IETF) Request for Comments (RFC) 5724, ISSN: 2070-1721, 2010, is incorporated herein by reference.

Rich Communication Suite (RCS)

Rich Communications Suite/Rich Communications System (RCS) is a communication protocol between mobile telephone carriers, between phones and carriers, and between individual devices aiming at replacing SMS messages with a message system that is richer, provides phonebook polling (e.g., for service discovery, etc.), and can transmit in-call multimedia. It is also marketed under the names of Advanced Messaging, Advanced Communications, Chat, joyn, Message+ and SMS+. RCS is also a communication protocol available for device-to-device (D2D) exchanges without using a telecommunications carrier for devices that are in close physical proximity (e.g., between two IoT devices, smart phones, smart phone and electronic tablet, etc.)

One advantage RCS Messaging has over SMS is that RCS enables users to send rich, verified messages including photos, videos and audio messages, group messages, read receipts, indicators to show other users are typing a message, carousel messages, suggested chips, chat bots, barcodes, location integration, calendar integration, dialer integration, and other RCS messaging features. RCS messaging includes person-to-person (P2P), application-to-person (A2P), application-to-application (A2A), application-to-device (A2D) and/or device-to-device (D2D) messaging.

The RCS Interworking Guidelines Version 14.0, 13 Oct. 2017, GSM Association, Rich Communication Suite RCS API Detailed Requirements, version 3.0, Oct. 19, 2017, Rich Communication Suite 8.0 Advanced Communications Services and Client Specification Version 9.0, 16 May 2018, RCS Universal Profile Service Definition Document Version 2.2, 16 May 2018, and Rich Communication Suite Endorsement of OMA CPM 2.2 Conversation Functions Version 9.0, 16 Oct. 2019, are all incorporated herein by reference.

The Rich Communication Suite-Enhanced (RCS-e) includes methods of providing first stage interoperability among Mobile Network Operators (MNOs). RCS-e is a later version of RCS which enables mobile phone end users to use instant messaging (IM), live video sharing and file transfer across any device on any MNO.

The RCS functionality of the present invention includes, but is not limited to, one and two way, rich, verified, multimedia messages including photos, videos and audio messages, group messages, read receipts, indicators to show other users are typing a message, predefined quick-reply suggestions, rich cards, carousels, action buttons, maps, click-to-call, calendar integration, geo-location, etc. The RCS functionality also includes RCS emulators and/or thin RCS applications that provide full and/ter selected features of available RCS functionality. The RCS message application 30a and the RCS interoperability application 30b provides full and/or partial RCS functionality including, but not limited to, RCS-e functionality.

RCS Interoperability Services

Figure 7B:
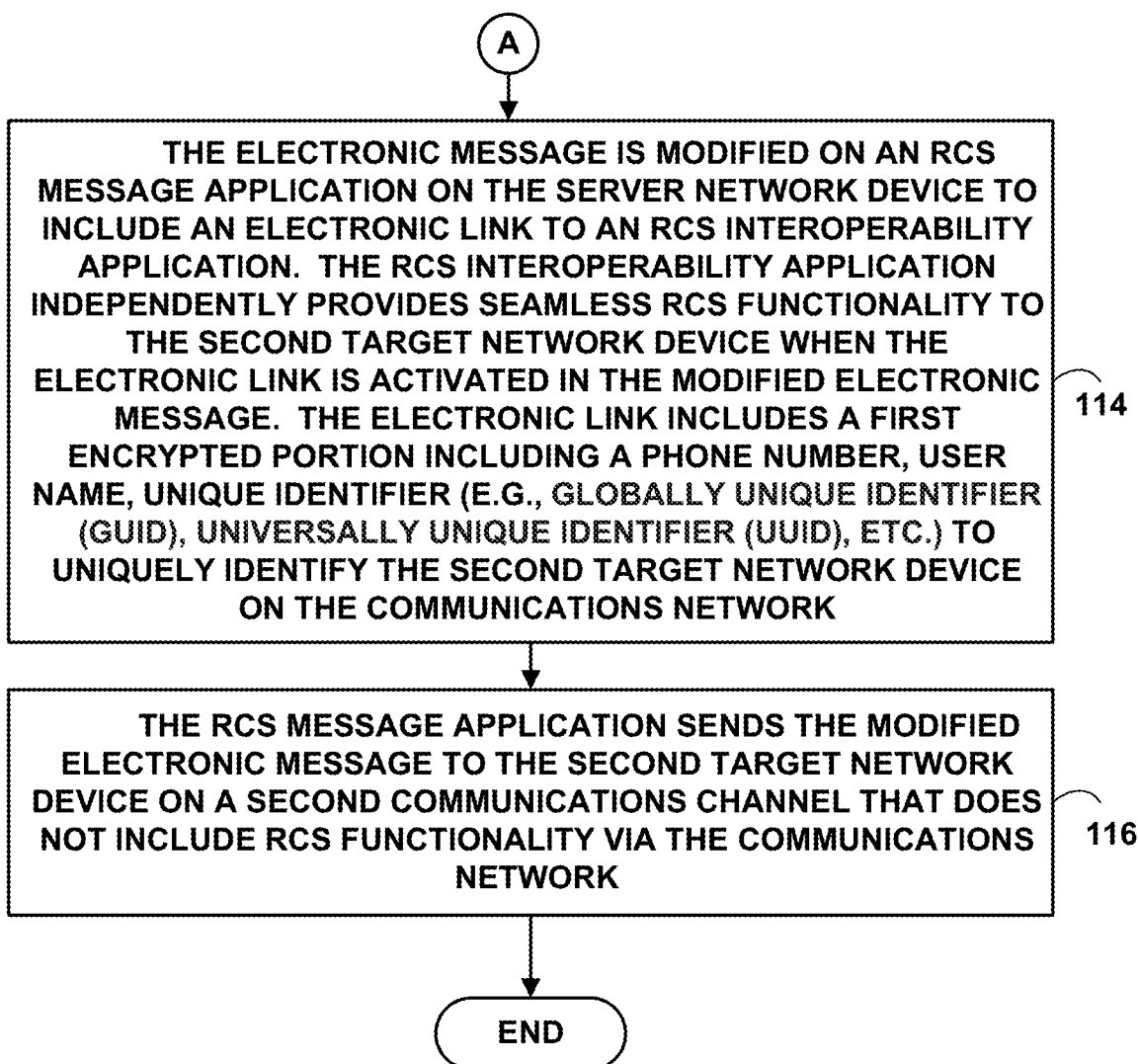

FIGS. 7A and 7B are a flow diagram illustrating a Method 106 for automatically RCS interoperability services. In FIG. 7A at Step 108, receiving an electronic message on a Rich Communication Suite (RCS) message application on a server network device with one or more processors on a first communications channel via a communications network from a first target network device with one or more processors for a second target network device with one or more processors, wherein RCS messaging includes two-way person-to-person (P2P) and application-to-person (A2P) messaging. At Step 110, the RCS message application conducts a test to determine if the second target network device can receive RCS messages. If at Step 110, the second target network device can receive RCS messages, at Step 112, the electronic message is sent from the RCS message application to the second target network device on a RCS communications channel via the communications network. The second target network device has access to RCS functionality from the electronic message. If at Step 110, the second target network device cannot receive RCS messages, in FIG. 7B at Step 114, the electronic message is modified on an RCS message application on the server network device to include an electronic link to an RCS interoperability application on the server network device creating a modified electronic message. The RCS interoperability application independently provides seamless RCS functionality to the second target network device when the electronic link is activated in the modified electronic message. The electronic link includes a first encrypted portion including a phone number, user name, unique network identifier (e.g., Globally Unique Identifier (GUID), Universally Unique Identifier (UUID), etc.) to uniquely identify the second target network device on the communications network and a second non-encrypted portion that provides RCS functionality via the RCS interoperability application on the server network device. At Step 116, the RCS message application sends the modified electronic message to the second target network device on another communications channel that does not include RCS functionality via the communications network, thereby providing RCS functionality via the RCS interoperability application on the server network device to the second network device.

The present invention is illustrated with an exemplary embodiment. However, the present invention is not limited to such an embodiment and other embodiments can be used to practice the invention.

In such an exemplary embodiment in FIG. 7A at Step 108, an electronic message 13 is received on a Rich Communication Suite (RCS) message application 30*a* on a server network device 20 with one or more processors on a first communications channel 17 via a communications network 18, 18' from a first target network device 12 with one or more processors for a second target network device 14 with one or more processors. The RCS messaging, includes, but is not limited to, person-to-person (P2P), application-to-person (A2P), application-to-application (A2A), application-to-device (A2D) and/or device-to-device (D2D) messaging.

In one embodiment, the RCS message application 30*a* is provided as a cloud SaaS 64 on a cloud communications network 18. However, the present invention is not limited to such an embodiment and the other embodiments can be used to practice the invention.

In one embodiment, the electronic message 13 is stored in one or more cloud storage objects 13/82. However, the present invention is not limited to such an embodiment and the other embodiments can be used to practice the invention.

At Step 110, the RCS message application 30*a* conducts a test to determine if the second target network device 14 can receive RCS messages. If at Step 110 the second target network device 14 can receive RCS messages, at Step 112, the electronic message 13 is sent from the RCS message application 30*a* to the second target network device 14 on a RCS communications channel 19 via the communications network 18, 18'. The second target network device 14 has access to RCS functionality from the electronic message 13.

In one embodiment, the test at Step 110 is conducted by sending and receiving a message to a third-party server via the communications network 18, 18'. For example, in one specific embodiment, the RCS message application 30*a* sends a device capability request to a third-party (e.g., GOOGLE, etc.) and receives a response as to whether the second target network device 14 has access to RCS functionality. However, the present invention is not limited to such an embodiment and the other embodiments can be used to practice the invention.

In one specific embodiment, the RCS message application 30*a* maintains a list of communications networks 18, 18' that do not support RCS functionality. In such a specific embodiment, if the second target network device 14 is on a communications network already known not to support RCS functionality, then the test at Step 110 is skipped as it is not necessary. However, the present invention is not limited to such an embodiment and the other embodiments can be used to practice the invention.

In another specific embodiment, the RCS message application 30*a* maintains a list of target network devices (e.g., by phone number, etc.) that do not support RCS functionality. In such a specific embodiment, if the second target network device 14 is on a communications network already known not to support RCS functionality, then the test at Step 110 is skipped as it is not necessary. However, the present invention is not limited to such an embodiment and the other embodiments can be used to practice the invention.

If at Step 110, the second target network device 14 cannot receive RCS messages, in FIG. 7B at Step 114, the electronic message 13 is modified 13' on the RCS message application 30*a* on the server network device 20 to include an electronic link 21 to an RCS interoperability application 30*b* on the server network device 20. The RCS interoperability application 30*b* on the server network device 20 independently provides seamless RCS functionality to the second target network device 14 when the electronic link 21 is activated in the modified electronic message 13'. The electronic link 21 includes, but is not limited to a first encrypted portion 23 including a phone number, user name, unique network identifier (e.g., Globally Unique Identifier (GUID) and/or Universally Unique identifier (UUID), cloud network identifier, and/or other unique identifier, etc.) to uniquely identify the second target network device 14 on the communications network 18, 18' to uniquely identify the second target network device on the communications network and a second non-encrypted portion 33 that provides access to RCS functionality via the RCS interoperability application on the server network device 20. However, the present invention is not limited to such an embodiment and the other embodiments can be used to practice the invention.

In one embodiment, the first encrypted portion 23 further includes a social media identifier (e.g., FACEBOOK, TWITTER, INSTAGRAM, YOUTUBE, WHATSAPP, etc.) instead of the phone number. In another embodiment, the first encrypted portion 23 includes both the phone number and social media identifier. However, the present invention is not limited to such embodiments, and other embodiments can be used to practice the invention.

In one embodiment, the first encrypted portion 23 includes the phone number, user name, unique network identifier (e.g., Globally Unique identifier (GUID) and/or Universally Unique Identifier (UUID), cloud network identifier, and/or other unique identifier, etc.) stored in a XML data format and encrypted from the XML data format.

In another embodiment, the electronic message 13 is modified 13' on the RCS message application 30*a* on the server network device 20 to include an electronic link 21 to an external program application that can provide RCS functionality, such as FACEBOOK Messenger, WHATSAPP, a chat bot application, etc. However, the present invention is not limited to such an embodiment and the other embodiments can be used to practice the invention.

The first encrypted portion 23 is encrypted/decrypted with any of the security and/or encryption methods described herein. The encryption methods prevent eavesdropping, hacking, changing, and/or other altering of the electronic link information. However, the present invention is not limited to such an embodiment and the other embodiments can be used to practice the invention.

The second non-encrypted portion 33 includes, but is not limited to a HTTP, HTTPS, TCP/IP, UDP/IP, Ethernet, etc., link portion and/or other electronic link portion.

In another embodiment, the first and second portions of the electronic link 21 are not encrypted and includes a plain text electronic link with the first and second portions both in plain text. However, the present invention is not limited to such an embodiment and the other embodiments can be used to practice the invention.

In another embodiment, the first and second portions of the electronic link 21 are both encrypted and include a fully encrypted electronic link. In such an embodiment, the full encrypted electronic link is automatically directed to a location of the RCS interoperability application 30*b* on the server network device 20 for decryption. However, the present invention is not limited to such an embodiment and the other embodiments can be used to practice the invention.

In one embodiment, the RCS interoperability application 30b is provided as a cloud SaaS 64 on the cloud communications network 18. However, the present invention is not limited to such an embodiment and the other embodiments can be used to practice the invention.

In one embodiment, the RCS interoperability application 30b is provided as a chat bot application and/or other multimedia chat application and/or other multi-media messenger application reachable by a web browser and/or other multi-media application reachable directly from an electronic messaging application (e.g., SMS, etc.) on the second network device via the communications network. However, the present invention is not limited to such an embodiment and the other embodiments can be used to practice the invention.

In one embodiment, the modified electronic message 13' is stored in one or more cloud storage objects 13'/82' on the cloud communications network 18. However, the present invention is not limited to such an embodiment and the other embodiments can be used to practice the invention.

At Step 116, the RCS message application 30a sends the modified electronic message 13' to the second target network device 14 on a second communications channel 25 that does not include RCS functionality via the communications network 18, 18', thereby providing RCS functionality via the RCS interoperability application 30b on the server network device to the second network device 14.

In one embodiment, the second communications channel 25 includes a SMS communications channel. However, the present invention is not limited to such an embodiment and the other embodiments can be used to practice the invention.

In another embodiment, the second communications channel 25 includes a channel to an API for FACEBOOK Messenger, WHATSAPP, another social media messenger, and/or a chat bot application, etc. However, the present invention is not limited to such an embodiment and the other embodiments can be used to practice the invention.

In another embodiment, the second communications channel 25 includes another type of telecommunications channel. However, the present invention is not limited to such an embodiment and the other embodiments can be used to practice the invention.

The RCS interoperability application 30b on the server network device 20 independently provides seamless full RCS functionality to the second target network device 14 via the communications network 18, 18' when the electronic link 21 is activated in the modified electronic message 13'/82'.

FIG. 8 is a flow diagram illustrating a Method 118 for providing interoperability for Rich Communications Suite (RCS) messaging. At Step 120, a second target network device with one or more processors that does not have RCS messaging functionality receives a modified electronic from an RCS message application on a server network device with one or more processors on a second communications channel via a communications network. The second communications channel does not include RCS functionality. The modified electronic messages includes an electronic link to an RCS interoperability application. The RCS interoperability application provides seamless RCS functionality to the second target network device via the second communications channel when the electronic link is activated in the modified electronic message. The electronic link includes, but is not limited to, an encrypted portion including a phone number, user name, unique network identifier (e.g., Globally Unique Identifier (GUID), Universally Unique Identifier (UUID), and/or other unique network identifier etc.) to uniquely identify the second target network device on the communications network and a second non-encrypted portion that provides RCS functionality via the RCS interoperability application At Step 122, the second target network device activates the electronic link in the modified electronic message activating RCS functionality on the second target network device from the RCS interoperability application via the second communications channel via the communications network.

The present invention is illustrated with an exemplary embodiment. However, the present invention is not limited to such an embodiment and other embodiments can be used to practice the invention.

In such an exemplary embodiment in FIG. 8 at Step 120, a second target network device 14 with one or more processors that does not have RCS messaging functionality receives a modified electronic 13'/82' from an RCS message application 30a on a server network device 20 with one or more processors on a second communications channel 25 via a communications network 18' 18. The second communications channel 25 does not include RCS functionality. The modified electronic message 13'/82' includes an electronic link 21 to an RCS interoperability application 30b on the server network device 20. The RCS interoperability application 30b on the server network device 20 provides seamless RCS functionality to the second target network device 14 via the second communications channel 25 when the electronic link 21 is activated in the modified electronic message 13'/82'. The electronic link 21 includes, but is not limited to, a first encrypted portion 23 including a phone number, user name, unique network identifier (e.g., Globally Unique Identifier (GUID), Universally Unique Identifier (UUID), etc.) to uniquely identify the second target network device 14 on the communications network 18, 18' and second non-encrypted portion 33 that provides RCS functionality via the RCS interoperability application 30b on the server network device 20 when activated.

In one embodiment, the RCS message application 30a and/or the RCS interoperability application 30b are provided as a cloud SaaS 64, 64' on the cloud communications network 18. However, the present invention is not limited to such an embodiment and the other embodiments can be used to practice the invention.

In one embodiment, the RCS interoperability application 30b is provided as an RCS chat application and/or other multimedia chat application and/or other multi-media application reachable by a web browser and/or other multi-media application reachable directly from an electronic messaging application (e.g., SMS, etc.) on the second network device via the communications network. However, the present invention is not limited to such an embodiment and the other embodiments can be used to practice the invention.

In one embodiment, the modified electronic message 13' is stored in one or more cloud storage objects 13'/82' on the cloud communications network 18. However, the present invention is not limited to such an embodiment and the other embodiments can be used to practice the invention.

The encryption portion 23 is encrypted/decrypted with any of the security and/or encryption methods described herein.

In one embodiment, the second communications channel 25 is a SMS communications channel. However, the present invention is not limited to such an embodiment and the other embodiments can be used to practice the invention.

At Step 122, the second target network device 14 activates the electronic link 21 in the modified electronic message 13'/82' activating RCS functionality on the second target network device 14 from the RCS interoperability application 30*b* on the server network device 20 via the second communications channel 25 via the communications network 18, 18'.

The RCS interoperability application 30*b* on the server network device independently provides seamless full RCS functionality to the second target network device 14 via the second communications channel 25 via communications network 18, 18' when the electronic link 21 is activated in the modified electronic message 13'/82'.

FIG. 9 is a flow diagram illustrating a Method 124 for providing interoperability for Rich Communications Suite (RCS) messaging. At Step 126, a second target network device with one or more processors without RCS functionality activates an electronic link in a modified electronic message activating RCS functionality on the second target network device from a RCS interoperability application on a server network device via a second communications channel via the communications network. At Step 128, the second target network device receives RCS access confirmation from the RCS interoperability application on the server network device via the second communications channel via the communications network. The RCS interoperability application on the server network device decrypts the first encrypted portion of the modified electronic message to confirm an identity of the second target network device on the communications network. At Step 130, the second network device accesses RCS functionality via the RCS interoperability application on the server network device via the second communications channel via the communications network sent by a first network device with one or more processors that includes RCS functionality, providing two-way RCS message communications between second target network device without RCS functionality and the first target network device with RCS functionality.

The present invention is illustrated with an exemplary embodiment. However, the present invention is not limited to such an embodiment and other embodiments can be used to practice the invention.

In such an exemplary embodiment in FIG. 9 at Step 126, a second target network device 14 with one or more processors without RCS functionality activates an electronic link 21 in a modified electronic message 13'/82' activating RCS functionality on the second target network device 14 from a RCS interoperability application 30*b* on the server network device 20 via a second communications channel 25 via the communications network 18, 18'.

At Step 128, the second target network device 14 receives RCS access confirmation from the RCS interoperability application 30*b* on the server network device via the second communications channel 25 via the communications network 18, 18'. The RCS interoperability application 30*b* on the server network device 20 decrypts the first encrypted portion 23 of the modified electronic message 13'/82' to confirm an identity of the second target network device 14 on the communications network 18,18'. The first encrypted portion 23 included the phone number, user name, unique identifier (e.g., Globally Unique Identifier (GUID), and/or Universally Unique identifier (UUID), etc.) of the second target network device 14 to uniquely identify the second target network device 14 on the communications network 18, 18'

At Step 130, the second network device 14 accesses RCS functionality via the RCS interoperability application 30*b* on the server network device 20 via the second communications channel 25 via the communications network 18, 18' sent by a first network device 12 with one or more processors that includes RCS functionality, providing two-way RCS message communications between the second target network device 14 without RCS functionality and the first target network device 12 with RCS functionality.

In another embodiment, only one-way RCS message communications is provided between the second target network device 14 without RCS functionality and the first target network device 12 with RCS functionality. However, the present invention is not limited to such an embodiment and other embodiments can be used to practice the invention.

Figure 10:
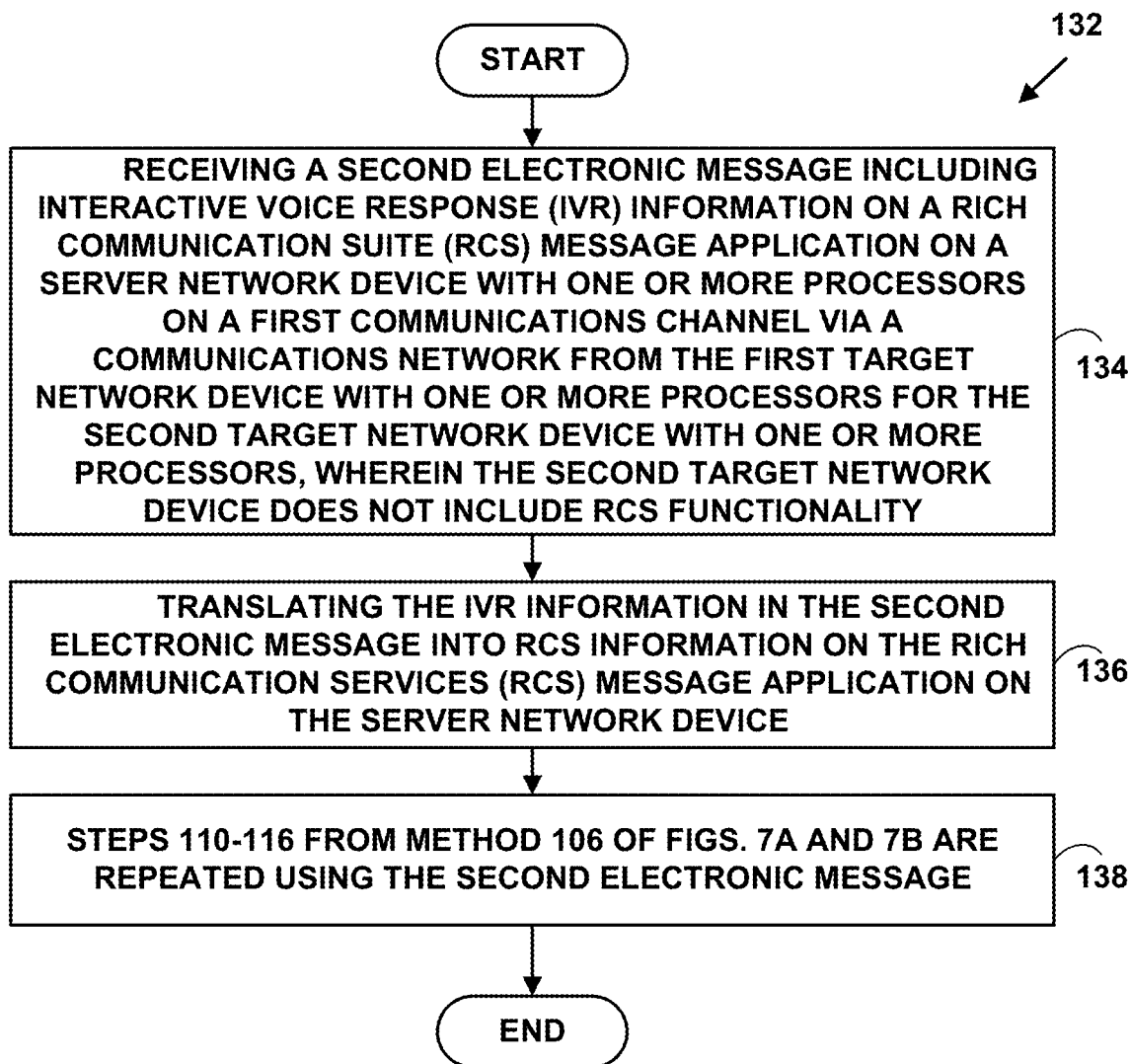
FIG. 10 is a flow diagram illustrating a method for providing interoperability for Rich Communications Suite (RCS) messaging.

FIG. 10 is a flow diagram illustrating a Method 132 for providing interoperability for Rich Communications Suite (RCS) messaging. At Step 134, a second electronic message is received including Interactive Voice Response (IVR) information on a Rich Communication Suite (RCS) message application on a server network device with one or more processors on a first communications channel via a communications network from the first target network device with one or more processors for the second target network device with one or more processors, wherein the second target network device does not include RCS functionality. At Step 136, translating the IVR information in the second electronic message into RCS information on the Rich Communication Suite (RCS) message application on the server network device. At Step 138, steps 110-116 from Method 106 of FIGS. 7A and 7B are repeated using the second electronic message.

The present invention is illustrated with an exemplary embodiment. However, the present invention is not limited to such an embodiment and other embodiments can be used to practice the invention.

In such an exemplary embodiment in FIG. 10 at Step 134, a second electronic message 15 is received including Interactive Voice Response (IVR) information on a Rich Communication Suite (RCS) message application 30*b* on a server network device 20 with one or more processors on a first communications channel 17 via a communications network 18,18' from the first target network device 12 with one or more processors for the second target network device 16 with one or more processors, wherein the second target network 16 device does not include RCS functionality.

Interactive voice response (IVR) is a technology that allows a computer to interact with humans through the use of voice and DTMF tones input via a keypad. In telecommunications, IVR allows customers to interact with a company's host system via a telephone keypad or by speech recognition, after which services can be inquired about through the IVR dialogue. IVR systems respond with pre-recorded or dynamically generated audio or text messages to further direct users on how to proceed. IVR systems deployed in the network are sized to handle large call volumes and are also used for outbound calling as IVR systems are more intelligent than many predictive dialer systems.

IVR systems are used for mobile purchases, banking payments, services, retail orders, utilities, travel information and weather conditions. A common misconception refers to an automated attendant as an IVR. The terms are distinct and mean different things to traditional telecommunications professional as the purpose of an IVR is to take input, process it, and return a result, whereas that of an automated attendant is to route calls. The term, voice response unit (VRU) is sometimes used as well.

The documents, "An Interactive Voice Response (IVR) Control Package for the Media Control Channel Framework" IETF RFC 6231 and "IRNA Registry for MEDI- ACTRL Interactive Voice Response Control Package," IETF RFC 6623, the contents of both which are incorporated herein by reference.

At Step 136, translating the IVR information in the second electronic message 15 into RCS information on the Rich Communication Suite (RCS) message application 30b on the server network device 20.

In another embodiment, Step 136, is replaced with Step 136' in which the RCS message application 30a on the server network device 20 indicates the IVR information in the second electronic message requires translation into RCS information for the second target network device 12 that does not include RCS functionality. However, the RCS message application 30a does not translate any IVR information into RCS information. In one embodiment, the IVR indication includes a data field in the second electronic message be set to indicate the second message includes IVR information that needs to be translated to RCS information. However, the present invention is not limited to this embodiment and other embodiments may be used to practice the invention.

At Step 138, steps 110-116 from Method 106 of FIGS. 7A and 7B are repeated using the second electronic message 15 and second network device 16.

A method and system for providing interoperability for Rich Communications Suite (RCS) messaging is presented herein. If a target network device cannot receive RCS messages, electronic messages are modified on an RCS message application to include an electronic link to an RCS interoperability application. The RCS interoperability application independently provides seamless, rich multi-media RCS functionality to the target network device when the electronic link is activated in the modified electronic message. The RCS interoperability application provides two-way RCS message communications between target network devices without RCS functionality and target network devices with RCS functionality.

It should be understood that the architecture, programs, processes, methods and systems described herein are not related or limited to any particular type of computer or network system (hardware or software), unless indicated otherwise. Various types of specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

Therefore, all embodiments that come within the scope and spirit of the proceeding described and equivalents thereto are identified and claimed as the invention.

We claim:

1. A method for automatically providing Rich Communication Suite (RCS) interoperability services, comprising:

receiving an electronic message on a Rich Communication Suite (RCS) message application on a server network device with one or more processors on a first communications channel via a communications network from a first target network device with one or more processors for a second target network device with one or more processors, wherein RCS messaging includes two-way, person-to-person (P2P), application-to-person (A2P), application-to-application (A2A), application-to-device (A2D) or device-to-device (D2D), RCS messaging;

conducting a test on the RCS message application on the server network device to determine whether the second target network device can directly receive RCS messages, and if so, sending the electronic message from the RCS message application on the server network device to the second target network device on a RCS communications channel via the communications network, wherein the second target network device has direct access to RCS functionality from the electronic message, and if not, modifying on the RCS message application on the server network device electronic message to include an electronic link to an RCS interoperability application on the server network device, thereby creating a modified electronic message, the electronic link including a first encrypted portion including a phone number, user name and a unique network identifier comprising a Globally Unique Identifier (GUID) or a Universally Unique Identifier (UUID), to uniquely identify the second target network device on the communications network and a second non-encrypted portion of the electronic link that provides to access to RCS functionality via the RCS interoperability application, wherein the RCS interoperability application on the server network device independently provides seamless RCS functionality to the second target network device when the electronic link is activated in the modified electronic message on the second target network device, and sending from the RCS message application on the server network device the modified electronic message to the second target network device on another communications channel other than on the RCS communications channel via the communications network, thereby providing RCS functionality via the RCS interoperability application to the second target network device.

2. The method of claim 1 wherein the first target network device, the second target network device and the server network device include one or more wireless communications interfaces comprising: cellular telephone, 802.11a, 802.11b, 802.11g, 802.11n, 802.15.4 (ZigBee), Wireless Fidelity (Wi-Fi), Wi-Fi Aware, Worldwide Interoperability for Microwave Access (WiMAX), ETSI High Performance Radio Metropolitan Area Network (HIPERMAN), Near Field Communications (NFC), Machine-to-Machine (M2M), 802.15.1 (Bluetooth), or infra data association (IrDA), wireless communication interfaces.

3. The method of claim 1 wherein first target network device and the second target network device include: desktop computers, laptop computers, tablet computers, mobile phones, non-mobile phones, smart phones, personal digital/data assistants (PDA), digital cameras, portable game consoles, non-portable game consoles, wearable network devices, Internet of Things (IoT) devices, cable television (CATV) set-top boxes, satellite television boxes, or digital televisions including high-definition (HDTV) and three-dimensional (3D) televisions.

4. The method of claim 1 wherein the first encrypted portion of the electronic link is encrypted using a Wireless Encryption Protocol (WEP), Advanced Encryption Standard (AES), Data Encryption Standard (DES), RSA encryption, Secure Hash Algorithm (SHA), Message Digest-5 (MD-5), Keyed Hashing for Message Authentication Codes (HMAC), Electronic Code Book (ECB) or Diffie and Hellman (DH), encryption or security method.

5. The method of claim 1 wherein the second non-encrypted portion of the electronic link includes a Hyper Text Transfer Protocol (HTTP) or a Hyper Text Transfer Protocol Secure (HTTPs) electronic link.

6. The method of claim 1 further comprising:
receiving on the second target network device with one or more processors that does not have RCS messaging functionality the modified electronic message from the RCS message application on the server network device with one or more processors on the second communications channel via the communications network,
wherein the second communications channel does not include RCS functionality, wherein the modified electronic messages includes an electronic link to the RCS interoperability application, the RCS interoperability application provides seamless RCS functionality to the second target network device via the second communications channel when the electronic link is activated in the modified electronic message, and
wherein the electronic link includes the first encrypted portion including a phone number, user name and unique identifier comprising the Globally Unique Identifier (GUID) or the Universally Unique Identifier (UUID), to uniquely identify the second target network device on the communications network and the second non-encrypted portion that provides access to the RCS functionality via the RCS interoperability application; and
activating from the second target network device the electronic link in the modified electronic message, RCS functionality on the second target network device from the RCS interoperability application via the second communications channel via the communications network.

7. The method of claim 1 further comprising:
activating on the second target network device with one or more processors without RCS functionality with the electronic link in the modified electronic message providing RCS functionality on the second target network device from the RCS interoperability application via the second communications channel via the communications network;
receiving RCS access confirmation on the second target network device from the RCS interoperability application on the server network device via the second communications channel via the communications network, the RCS interoperability application decrypting the first encrypted portion of the modified electronic message to confirm an identity of the second target network device on the communications network;
accessing from the second target network device the RCS functionality via the RCS interoperability application via the second communications channel via the communications network sent by the first network target device with one or more processors that includes RCS functionality, providing two-way RCS message communications between second target network device without RCS functionality and the first target network device with RCS functionality.

8. The method of claim 1 further comprising:
receiving a second electronic message including Interactive Voice Response (IVR) information on a Rich Communication Suite (RCS) message application on the server network device with one or more processors on the first communications channel via the communications network from the first target network device with one or more processors for the second target network device with one or more processors, wherein the second target network device does not include RCS functionality; and
translating the IVR information in the second electronic message into RCS information on the RCS message application on the server network device to send to the second target network device that does not include RCS functionality.

9. The method of claim 1 further comprising:
receiving a second electronic message including Interactive Voice Response (IVR) information on a Rich Communication Suite (RCS) message application on the server network device with one or more processors on the first communications channel via the communications network from the first target network device with one or more processors for the second target network device with one or more processors, wherein the second target network device does not include RCS functionality; and
indicating on the RCS message application on the server network device the IVR information in the second electronic message requires translation into RCS information for the second target network device that does not include RCS functionality.

10. The method of claim 1 wherein the step of conducting a test further includes:
sending a query message from the RCS message application on the server network device to a second server network device with one or more processors via the communications network to determine if the second target network device includes RCS functionality, wherein the second server network device includes a list of target network devices that include RCS functionality; and
receiving a query response message from the second server network device via the communications network on the RCS message application on the server network device indicating whether the second target network device includes RCS functionality.

11. The method of claim 1 wherein the step of conducting a test further includes:
determining with from the RCS message application on the server network device with one or more queries to one or more databases associated with the server network device to determine if the second server network device includes RCS functionality, wherein the one or more databases includes a list of target network devices that include RCS functionality.

12. The method of claim 1 wherein the first encrypted portion further includes a social media identifier.

13. The method of claim 1 wherein the first encrypted portion further includes a unique cloud communications network identifier.

14. The method of claim 1 wherein second communications channel includes a Short Message Service (SMS), messenger application, social media messenger application, or chat bot, communications channel.

15. The method of claim 1 wherein the RCS interoperability application further includes RCS-enhanced (RCS-e) functionality.

16. The method of claim 1 wherein the RCS message application and RCS interoperability application further include an Artificial intelligence (AI) application.

17. The method of claim 1 wherein the server network device includes a plurality of cloud applications and one or more cloud databases communicating with a cloud communications network, the plurality of cloud applications providing a plurality of RCS cloud services including: a cloud computing Infrastructure as a Service (IaaS), a cloud computing Platform as a Service (PaaS) and RCS interoperability and functionality as a Software as a Service (SaaS).

18. The method of claim 17 wherein the one or more cloud databases include one or more cloud storage objects comprising one or more of a REpresentational State Transfer (REST) or Simple Object Access Protocol (SOAP), Lightweight Directory Access Protocol (LDAP) cloud storage objects, portions thereof, or combinations thereof, stored in the one or more cloud databases.

19. A non-transitory computer readable medium having stored therein a plurality of instructions for executing the steps of:

receiving an electronic message on a Rich Communication Suite (RCS) message application on a server network device with one or more processors on a first communications channel via a communications network from a first target network device with one or more processors for a second target network device with one or more processors, wherein RCS messaging includes two-way, person-to-person (P2P), application-to-person (A2P), application-to-application (A2A), application-to-device (A2D) or device-to-device (D2D), RCS messaging;

conducting a test on the RCS message application on the server network device to determine whether the second target network device can directly receive RCS messages, and if so, sending the electronic message from the RCS message application on the server network device to the second target network device on a RCS communications channel via the communications network, wherein the second target network device has direct access to RCS functionality from the electronic message, and if not, modifying on the RCS message application on the server network device electronic message to include an electronic link to an RCS interoperability application on the server network device, thereby creating a modified electronic message, the electronic link including a first encrypted portion including a phone number, user name and a unique network identifier comprising a Globally Unique Identifier (GUID) or a Universally Unique Identifier (UUID), to uniquely identify the second target network device on the communications network and a second non-encrypted portion of the electronic link that provides to access to RCS functionality via the RCS interoperability application, wherein the RCS interoperability application on the server network device independently provides seamless RCS functionality to the second target network device when the electronic link is activated in the modified electronic message on the second target network device, and sending from the RCS message application on the server network device the modified electronic message to the second target network device on another communications channel other than on the RCS communications channel via the communications network, thereby providing RCS functionality via the RCS interoperability application to the second target network device.

20. A system for automatically providing Rich Communication Suite (RCS) interoperability services, comprising in combination:

a plurality of target network devices each with one or more processors;

one or more server network devices each with one or more processors;

a communications network;

for receiving an electronic message on a Rich Communication Suite (RCS) message application on a server network device with one or more processors on a first communications channel via a communications network from a first target network device with one or more processors for a second target network device with one or more processors, wherein RCS messaging includes two-way, person-to-person (P2P), application-to-person (A2P), application-to-application (A2A), application-to-device (A2D) or device-to-device (D2D), RCS messaging;

for conducting a test on the RCS message application on the server network device to determine whether the second target network device can directly receive RCS messages, and if so, for sending the electronic message from the RCS message application on the server network device to the second target network device on a RCS communications channel via the communications network, wherein the second target network device has direct access to RCS functionality from the electronic message, and if not, for modifying on the RCS message application on the server network device electronic message to include an electronic link to an RCS interoperability application on the server network device, thereby creating a modified electronic message, the electronic link including a first encrypted portion including a phone number, user name and a unique network identifier comprising a Globally Unique Identifier (GUID) or a Universally Unique Identifier (UUID), to uniquely identify the second target network device on the communications network and a second non-encrypted portion of the electronic link that provides to access to RCS functionality via the RCS interoperability application, wherein the RCS interoperability application on the server network device independently provides seamless RCS functionality to the second target network device when the electronic link is activated in the modified electronic message on the second target network device, and for sending from the RCS message application on the server network device the modified electronic message to the second target network device on another communications channel other than on the RCS communications channel via the communications network, thereby providing RCS functionality via the RCS interoperability application to the second target network device.

\* \* \* \* \*